Patented Apr. 15, 1941

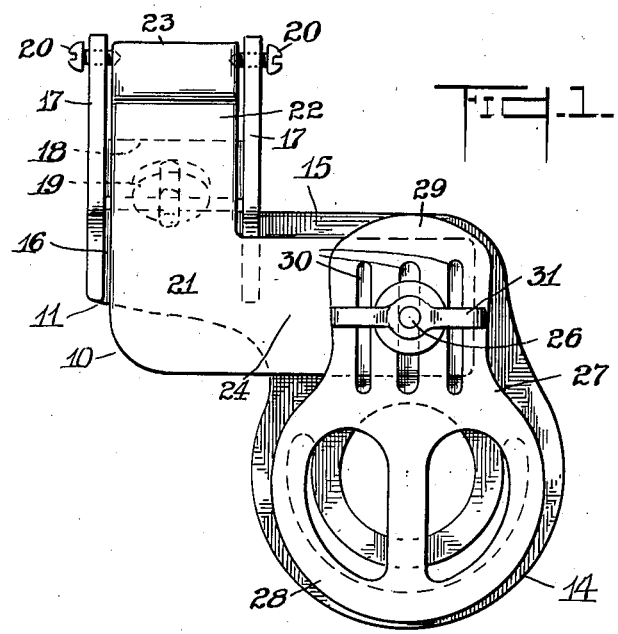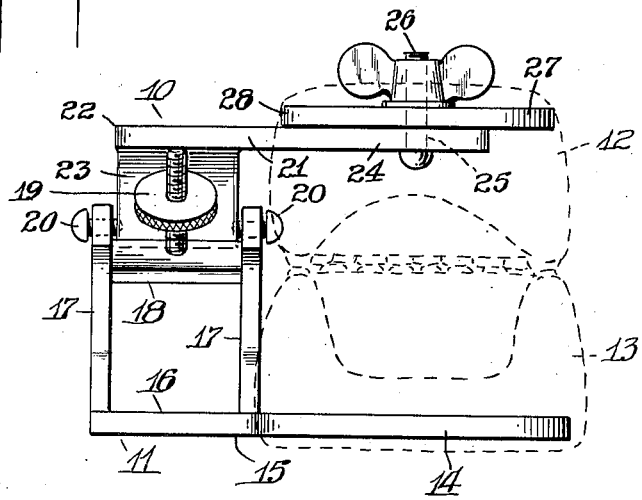

2,238,551

UNITED STATES PATENT OFFICE 2,238,551

DENTAL ARTICULATOR WITH OFFSET PIVOTAL CONNECTION FOR THE HOLDERS

Victor Bloom and Benjamin Siegel, New York, N. Y.

Application May 29, 1940, Serial No. 337,804

4 Claims. (Cl. 32—32)

This invention relates to improvements in dental articulators, a device for holding models of portions of the human jaws and teeth in articulated relation.

Dental articulators are normally constructed with two holders or jaws pivotally connected at a point directly in the rear of the device. The pivotal connection so arranged bars free access to the working space at the back of the models holding the teeth and renders adjustment thereof extremely difficult.

With the foregoing in mind, it is the object of the present invention to provide a dental articulator of this character in which the pivotal point of the holders or jaws is offset to the side and rear thereof, whereby a free and clear working space will be provided at the rear of the models and their teeth.

One embodiment of the invention is hereinafter described, set forth in the appended claims and illustratively exemplified in the accompanying drawing, in which:

Figure 1 is a top plan view of a dental articulator according to the present invention; and Figure 2 is a rear elevational view of the same showing the models and teeth in dotted lines.

Referring to the drawing in detail, 10 and 11, respectively, are the upper and lower holders or jaws adapted to hold models 12 and 13, as of the upper and lower teeth and related jaw structures.

The lower jaw 11 comprises a laterally projecting plate 14 preferably circular in shape and suitably perforated to provide strength and lightness to the material. The rear portion 15 of the plate 14 projects beyond the circumference of the circle and then to the side to provide an offset arm 16. Supported upright on the arm 16 are two upright posts 17 spaced from each other along a line parallel to the transverse axis of the jaw. The inside post 17 of the pair is disposed preferably outside the periphery of the jaw so that a line drawn as a continuation of the inner post will coincide with a line tangential to the periphery of the jaw and perpendicular to the transverse axis thereof. The posts 17 project upwardly and rearwardly so that they overhang to a considerable extent the extended rear portion of the jaw proper, as shown in Figure 1. The posts are connected midway of their length by a bridge piece 18 to support a set screw adjustment 19. The extreme ends of the posts are provided with axially alined screws 20 having tapered ends about which the upper jaw 10 is pivotally mounted.

The upper jaw 10 comprises an L-shaped flat part 21, the longer arm 22 of which is disposed between and over the posts 17 and is provided with a downwardly and rearwardly projecting portion 23 having alined openings in its side walls to receive the tapered ends of screws 20 and to form a pivotal connection between the jaws. The other arm 24 projects over and above the rear portion 15 of the lower jaw 11 and is provided with an opening 25 to receive an upright screw 26. Adjustable laterally of the arm 24 and resting upon the latter is a plate 27 comprising a substantially circular portion 28 and rearwardly projecting part 29, the latter having a plurality of parallel slots 30, the center one thereof being radial of the portion 28. The plate 27 is suitably perforated and is adjustably mounted on the arm 24 by placing one of the slots 30, preferably the center one, over the upright screw 26 and tightening a butterfly nut 31 over the screw and against the plate 27 to bring it tightly into contact with the arm 24, as illustrated clearly in Figure 2.

In using the present device, the preliminary work of making the models and adjusting the plates to bring the front teeth into occlusion and enable the bite of the teeth to be examined and if necessary corrected, is substantially the same as that practiced with any dental articulator except, of course, that the work is greatly facilitated because of the unobstructed working space at the rear of the device. However, it is when both models are completed in the laboratory and the dentist assembles the completed work in his articulator, that the present device is particularly useful, because, since the work is offset from the pivotal connections, the dentist has a free, unobstructed view and working space in which to examine the normal setting of the rear of the teeth, correct their positions if required and perform whatever other adjustments are necessary.

It is pointed out that the present invention, wherein the pivotal point of the holders or jaws is offset to the side and rear thereof, may be applied to any of the various types and styles of dental articulators, including such devices as contemplate the oscillatory as well as the lateral articulation of the jaws or holders.

Having now described this invention and the manner in which the same may be practiced, what we claim and desire to secure by Letters Patent is:

1. A dental articulator having a pair of spaced apart model holders, each including a jaw base, said jaw bases being arranged one above the other and having their middle lines normally disposed on a common vertical center plane, a support connected to, offset rearwardly and to one side only of one of said holders and a pivotal connection carried by said support and connected with the other holder at one side thereof, said pivotal connection having its pivot axis at right angles to said center plane and being disposed completely outside of a vertical plane extending parallel to said vertical plane and tangentially to the outermost lateral boundary of said jaw bases on the side thereof adjacent said pivotal connection.

2. A dental articulator having a pair of spaced apart model holders, each including a jaw base, said jaw bases being arranged one above the other and having their middle lines normally disposed on a common vertical center plane, an upstanding and rearwardly projecting support carried by and offset to one side only of one of said holders, and a pivotal connection carried by said support and connected with the other holder at one side thereof, said pivotal connection having its pivot axis at right angles to said center plane and being disposed completely outside of a vertical plane extending parallel to said center plane and tangentially to the outermost lateral boundary of said jaw bases on the side thereof adjacent said pivotal connection.

3. A dental articulator having a pair of spaced apart model holders, each including a jaw base, said jaw bases being arranged one above the other and having their middle lines normally disposed on a common vertical center plane, the lower holder including a rearwardly and sidewardly projecting portion, a pair of spaced upright posts mounted on said projecting portion outside of a vertical plane extending parallel to said center plane and tangentially to the outermost lateral boundary of said jaw bases on the side thereof adjacent said projecting portion, said posts being provided with rearwardly projecting end portions, the upper holder including a member pivotally connected to the rearwardly projecting end portions of said posts and provided with an angularly disposed section, said upper jaw base being adjustably mounted on the free end of said section.

4. A dental articulator, as claimed in claim 3, in which said member of the upper holder is an L-shaped flat piece of material, one arm thereof being inclined downwardly at its free end and disposed between the said posts to receive the pivotal connection, the other arm of said piece projecting in the direction of the sidewardly projection of the lower holder.

VICTOR BLOOM.
BENJAMIN SIEGEL.